United States Patent [19]

Maeda et al.

[11] Patent Number: 5,387,669
[45] Date of Patent: Feb. 7, 1995

[54] PROCESS FOR PREPARING ROSIN ESTER AND COLORLESS ROSIN

[75] Inventors: Masao Maeda; Yukiharu Yamada; Yutaka Koba, all of Osaka, Japan

[73] Assignee: Arakawa Kagaku Kogyo Kabushiki Kaisha, Osaka, Japan

[21] Appl. No.: 107,685

[22] PCT Filed: Dec. 17, 1992

[86] PCT No.: PCT/JP92/01653

§ 371 Date: Aug. 17, 1993

§ 102(e) Date: Aug. 17, 1993

[87] PCT Pub. No.: WO93/13180

PCT Pub. Date: Jul. 8, 1993

[30] Foreign Application Priority Data

Dec. 21, 1991 [JP] Japan ................................. 3-356000
Mar. 26, 1992 [JP] Japan ................................. 4-101795
Mar. 26, 1992 [JP] Japan ................................. 4-101799
Mar. 30, 1992 [JP] Japan ................................. 4-192644

[51] Int. Cl.⁶ ............................................. C09F 1/04
[52] U.S. Cl. ................................. 530/216; 530/210; 530/215; 527/602
[58] Field of Search ................. 530/210, 216, 215; 527/602

[56] References Cited

U.S. PATENT DOCUMENTS

| | | | |
|---|---|---|---|
| 4,248,770 | 2/1981 | Matsuo et al. | 530/21 |
| 4,302,371 | 11/1981 | Matsuo et al. | 530/210 |
| 4,447,354 | 5/1984 | Scharrer et al. | 530/210 |
| 4,643,848 | 2/1987 | Thomas et al. | 260/102 |
| 4,847,010 | 7/1989 | Maeda et al. | 530/216 |

FOREIGN PATENT DOCUMENTS

0121125 10/1984 European Pat. Off. .
1541122 1/1968 France .
2429248 1/1980 France .

OTHER PUBLICATIONS

Supplementary European Search Report in EP Appln. 93900394.3 mailed Jul. 8, 1994.

*Primary Examiner*—John Kight, III
*Assistant Examiner*—Richard Jones
*Attorney, Agent, or Firm*—Varndell Legal Group

[57] ABSTRACT

The present invention relates to a process for preparing a rosin ester, which comprises esterifying a purified product of a disproportionated rosin with an alcohol, and then subjecting the esterified rosin to dehydrogenation in the presence of a dehydrogenating catalyst, a process for preparing a rosin ester, which comprises heating a purified rosin and an alcohol in the presence of a disproportionating catalyst, simultaneously subjecting the resulting rosin to disproportionation and esterification, dehydrogenating the reactant in the presence of a dehydrogenating catalyst, and thereafter adding an organic phosphorus compound to the reaction system, a process for preparing a colorless rosin, which comprises simultaneously subjecting a purified rosin to disproportionation and dehydrogenation in the presence of a catalyst, and then adding an organic phosphorus compound to the reaction system and a process for preparing a colorless rosin, which comprises dehydrogenating a purified disproportionated rosin in the presence of a dehydrogenating catalyst. According to the present invention, rosin esters and colorless rosins which have remarkably improved various properties from the viewpoints of color tone, odor, stability and the like can be cheaply provided.

8 Claims, No Drawings

PROCESS FOR PREPARING ROSIN ESTER AND COLORLESS ROSIN

DESCRIPTION

1. Technical Field

The present invention relates to processes for preparing a rosin ester and a rosin which are colorless and odorless and have an excellent stability.

1. Background Art

Heretofore, rosins and rosin esters being the derivatives thereof have been used variously as tackifiers for hot-melt adhesives and pressure-sensitive adhesives, modifiers for rubbers and various plastics, base materials for chewing gum, and raw materials such as resins for traffic paints, sizing agents for paper making, emulsifiers for synthetic rubbers, resins for ink and resins for coating, and the like. However, appearance of the above-mentioned rosin compounds was colored in yellow or yellowish brown, and the compounds were not satisfactory from the viewpoints of odor, thermal stability and weatherability (hereinafter referred to thermal stability and weatherability as stability), and the like.

Therefore, in order to dissolve the above-mentioned problems in the rosin compounds, a disproportionated rosin having an improved thermal stability which is prepared by disproportionating an unpurified rosin, a hydrogenated rosin having a somewhat improved stability which is prepared by hydrogenating an unpurified rosin, or their ester compounds which are prepared by esterifying the above-mentioned disproportionated rosin by hydrogenated rosin are commercially available. However, each and every one of these rosin compounds does not have satisfactory color tone, stability, and the like.

Japanese Examined Patent Publication No. 33771/1970 and Japanese Examined Patent Publication No. 20599/1974 disclose a method for disproportionating rosins or rosin compounds with a specific organic sulfur compound. However, the disproportionated rosin esters or the disproportionated rosins which are obtained according to these methods are not satisfactory from the viewpoints of color tone, stability and odor.

Japanese Unexamined Patent Publication No. 9605/1980 discloses a process for preparing rosin esters having a higher stability, comprising purifying a disproportionated rosin to remove high molecular weight materials, unsaponifiable materials and the like which are contained in the raw rosin and sucessively esterifying the purified disproportionated rosin with an alcohol. The rosin ester obtained according to the process is relatively superior in light color and stability to the known rosin esters. However, the obtained rosin ester is colored in the above-mentioned esterifying step and does not have a satisfactory heat coloration resistance. Accordingly, the obtained rosin ester should be improved upon the properties mentioned above.

Also, U.S. Pat. No. 4,847,010 discloses a process for preparing a colorless rosin ester having a high stability. Japanese Unexamined Patent Publication No. 85265/1989 discloses a process for preparing a colorless rosin having a high stability. However, a hydrogenating step is indispensable to these processes. In the processes, an advanced high-pressure-proof apparatus is necessarily used, or a large quantity of hydrogen is consumed. The cost of preparation is remarkably increased thereby. Therefore, these processes are disadvantageous.

Further, Japanese Unexamined Patent Publication No. 230072/1984 discloses a process for preparing a light-colored rosin ester having a high stability, comprising esterifying a purified rosin by distillation with an alcohol in the presence of a specific organic sulfur compound having abilities of both disproportionating and light-coloring. However, the obtained rosin ester does not have satisfactory color tone and stability and there is a problem that the obtained rosin ester has strong sulfuric odor which is generated from the organic sulfur compound when the rosin ester is heated.

As mentioned above, any conventional rosin esters, rosins, disproportionated rosins and hydrogenated rosins have not yet been satisfactory in odor, color tone and stability concurrently. In addition, the above-mentioned rosin compounds could not have competed at all in the above-mentioned properties with the hydrogenated petroleum resins, which are employed in the same uses as the rosin compounds. Therefore, it has been desired to find a rosin ester and a rosin which are colorless and have a high stability.

In consideration of the above-mentioned circumstances, the present inventors have studied to develop novel processes for preparing a rosin ester and a rosin of which various properties such as color tone, odor and stability have been further improved, in comparison with those of conventional rosin esters and rosins, which enable to cheaply provide such a rosin compound.

DISCLOSURE OF THE INVENTION

Namely, the present invention relates to a process for preparing a rosin ester, which comprises esterifying a purified product of a disproportionated rosin with an alcohol, and then subjecting the esterified rosin to dehydrogenation in the presence of a dehydrogenating catalyst, a process for preparing a rosin ester, which comprises heating a purified rosin and an alcohol in the presence of a disproportionating catalyst, simultaneously subjecting the resulting rosin to disproportionation and esterification, dehydrogenating the reactant in the presence of a dehydrogenating catalyst, and thereafter adding an organic phosphorus compound to the reaction system, a process for preparing a colorless rosin, which comprises simultaneously subjecting a purified rosin to disproportionalion and dehydrogenation in the presence of a catalyst, and then adding an organic phosphorus compound to the reaction system and a process for preparing a colorless rosin, which comprises dehydrogenating a purified disproportionated rosin in the presence of a dehydrogenating catalyst.

In order to dissolve the above-mentioned problems, the present inventors have investigated a process for preparing a rosin compound having improved properties mentioned above with giving a consideration of various conditions such as a kind of raw rosin being a starting material, a procedure for purification and dehydrogenation, as occasion demands, disproportionation, esterification and an oxidation inhibitor. As the result, it has been found that a rosin ester-and a colorless rosin which have excellent various properties suitable for the object of the present invention can be cheaply obtained by novel processes for preparing a rosin ester or a colorless rosin which comprises using a specific raw rosin, if necessary, purifying the rosin and then subjecting the resultant to a specific reaction step without using any organic sulfur compound which imparts a bad odor thereto. Thereby the above-mentioned problems have been dissolved.

The present invention relates to novel processes which can provide a rosin ester and a colorless rosin, of which appearance is nearly equal to colorless, being odorless at heating and excellent in stability. In accordance with the above-mentioned processes, there are provided a rosin ester and a colorless rosin, which remove the conventional fixed thought derived from the various properties of the known rosin esters and rosins and cannot be expected therefrom. The rosin ester and colorless rosin prepared in accordance with the processes of the present invention have no inferiority in comparison with the hydrogenated petroleum resin which is representative of light-colored resins. Further, the above-mentioned rosin ester and rosin retain an inherent characteristic, that is a good compatibility with various polymers.

Hereinafter the processes for preparing a rosin ester and the processes for preparing a colorless rosin according to the present invention are explained in detail.

There are two kinds of processes for preparing a rosin ester of the present invention. One of them is a process for obtaining a rosin ester having the above-mentioned excellent various properties without adding any stabilizer such as an oxidation inhibitor or a coloring inhibitor. The above-mentioned process of the present invention comprises three stages of process, that is, a step for purifying a disproportionated rosin, a step for esterifying the purified disproportionated rosin with one of various alcohols and a step for subjecting the above-mentioned esterified compound to dehydrogenation.

To the process of the present invention, it is indispensable to use a disproportionated rosin as a raw rosin from the viewpoints of color tone, stability and the like of the resulting rosin ester. The above-mentioned disproportionated rosin means a reaction product obtained by disproportionating gum rosin, wood rosin and tall oil rosin, of which main components are resin acids such as abietic acid, palustric acid, neobietic acid, pimaric acid, isopimaric acid and dehydroabietic acid.

The disproportionated rosin used in the process of the present invention can be easily prepared by subjecting a raw rosin to a conventional disproportionation. That is, the disproportionation is carried out by heating a rosin in the presence of a disproportionating catalyst. Examples of the disproportionating catalyst are various known catalysts, for instance, metal-supported catalysts such as palladium carbon, rhodium carbon and platinum carbon, powder of metals such as nickel and platinum, iodine, iodides such as iron iodide, and the like. The above-mentioned catalyst is usually employed in an amount of 0.01 to 5% by weight, preferably 0.01 to 1.0% by weight on the basis of the amount of the rosin employed. The reaction temperature is 100° to 300° C., preferably 150° to 290° C.

In the process of the present invention, it is necessary to purify the disproportionated rosin obtained in the preceding step. The term purification described here is intended to mean removing high molecular weight materials which are presumed to be formed from peroxides contained in the undisproportionated and disproportionated rosins, and unsaponifiable materials which are originally contained in the above-mentioned rosins. Concretely, the purification may be carried out according to usual purification methods such as distillation, recrystallization and extraction. From the viewpoint of purifying the raw material industrially, it is preferable that the rosin is purified by distillation. In case of purifying the rosin by distillation, usually a temperature of 200° to 300° C. and a pressure of 1 to 10 mmHg are employed suitably in consideration of the period of time for distilling. In case of purifying the rosin by recrystallization, the recrystallization can be carried out, for instance, by preparing a solution of the disproportionated rosin in a good solvent, distilling the good solvent out of the solution to give a concentrated solution and then adding a poor solvent thereto. Examples of the good solvent are, for instance, benzene, toluene, xylene, chloroform, lower alcohols, ketones such as acetone, lower alkyl acetates such as ethyl acetate, and the like. Examples of the poor solvent are, for instance, n-hexane, n-heptane, cyclohexane, isooctane, and the like. Further, the purified raw rosin can be also produced by preparing an alkaline solution of the raw rosin with an alkaline aqueous solution, extracting unsaponifiable materials which are not dissolved in the alkaline aqueous solution with an organic solvent and then neutralizing the extracted aqueous layer.

In the process of the present invention, the above-mentioned purified disproportionated rosin is then esterified with one of various alcohols. The esterification can be carried out according to usual conditions as they are. For instance, it may be carried out by heating the mixture of the purified disproportionated rosin and the alcohol exemplified hereinafter usually at 150° to 300° C. in a stream of an inert gas to remove generated water from the mixture outside of the reaction system. Examples of the alcohol employed in the above process are, for instance, monohydric alcohols such as n-octyl alcohol, 2-ethylhexyl alcohol, decyl alcohol and lauryl alcohol; dihydric alcohols such as ethylene glycol, diethylene glycol, propylene glycol, neopentyl glycol and cyclohexanedimethanol; trihydric alcohols such as glycerol, trimethylolethane and trimethylolpropane; and tetrahydric alcohols such as pentaerythritol and diglycerol; and the like. An esterifying catalyst is not necessarily required at esterifying. However, the esterifying catalyst may be employed so as to shorten the period of time for esterifying. Examples of the esterifying catalyst are, for instance, acidic catalysts such as acetic acid and paratoluenesulfonic acid, alkaline metal hydroxides such as calcium hydroxide, metal oxides such as calcium oxide and magnesium oxide.

A rosin ester as a desired product of the invention can be obtained by subjecting the ester compound of the purified disproportionated rosin obtained by the above-mentioned step to dehydrogenation as a final step. The term dehydrogenation described here means the changing of ratio in the composition of dehydroabietic acid and dihydroabietic acid being main resin acid components in the above-mentioned disproportionated rosin ester, concretely, the increasing of a dehydroabietic acid content which is caused by dehydrogenating dihydroabietic acid component to give dehydroabietic acid. According to the above-mentioned dehydrogenation, 2 moles of hydrogen is generated from 1 mole of dihydroabietic acid component. The generated hydrogen enables to efficiently reduce peroxides which exist in a small amount in the esterified compounds of the purified disproportionated rosin. Namely, a nearly colorless rosin ester can be obtained by utilizing the above-mentioned reducing action.

The reaction conditions of the above-mentioned dehydrogenation are not particularly limited, and usual conditions can be employed. For instance, it may be carried out by heating the obtained rosin ester in a closed reaction vessel in the presence of a dehydrogenating catalyst under an initial pressure of hydrogen of less than 10 Kg/cm$^2$, preferably less than 5 Kg/cm$^2$ at a reaction temperature of 100° to 300° C., preferably 200° to 280° C. In the above-mentioned reaction, hydrogen is not substantially required because it is a dehydrogenation. However, less than 10 Kg/cm$^2$ of an initial pressure of hydrogen is determined on purpose to utilize the generated hydrogen for reducing peroxides. The pressure of hydrogen may be adjusted by its own pressure of the generated hydrogen, or by supplying a little amount of hydrogen to the vessel from the outside thereof. In the process of the present invention, there is no limitation in the dehydrogenating catalyst, and various known dehydrogenating catalysts can be employed. Preferably, a palladium catalyst, a rhodium catalyst or a platinum catalyst is employed as the dehydrogenating catalyst. The above-mentioned catalyst is usually supported onto a carrier such as silica, alumina or carbon and then employed. The amount of the employed dehydrogenating catalyst is usually 0.01 to 5% by weight, preferably 0.1 to 3% by weight based upon the amount of the employed rosin ester. In case of carrying out the dehydrogenation, a solvent, for instance, an alicyclic hydrocarbon such as cyclohexane or decalin, an aromatic hydrocarbon such as toluene or xylene, or the like can be suitably employed.

Although the composition of resin acids in the rosin ester obtained according to the above-mentioned process slightly varies with a pressure of supplied hydrogen, usually the composition is 15 to 35% by weight of dihydro component and 85 to 65% by weight of dehydroabietic acid. Also, the peroxide value of thus obtained rosin ester is usually not more than 1.

The rosin ester obtained according to the above-mentioned process of the present invention, of which appearance is nearly equal to colorless, has excellent various properties such as odorless at heating, a high stability and a good compatibility. Therefore, the rosin ester of the invention can be suitably used as tackifiers for pressure-sensitive adhesives and hot-melt adhesives, modifiers for rubbers and various plastics, raw materials for traffic paints, base materials for chewing gum and modifiers for ink and paints, and the like. When the rosin ester of the invention is employed in those uses, value of final products as goods can be improved.

The other process for preparing a rosin ester of the present invention is explained below.

It has been considered that coloring of a rosin ester is caused by high molecular weight materials and unsaponifiable materials which are colored by oxidation and contained in a raw rosin, a resin acid having a conjugated double bond which exhibits a high oxygen absorbing property, such as abietic acid is contained in a raw rosin, or the like. Thus the process of the present invention has been accomplished on purpose to remove the above-mentioned causes. To the process of the present invention, are indispensable (1) to employ a purified rosin as a starting material, (2) to simultaneously subject the above-mentioned purified to rosin to disproportionation and esterification, (3) to dehydrogenate the above-mentioned esterified compound and (4) to add an organic phosphorus compound which can function as an agent for decomposing peroxides, an oxidation inhibitor or the like to the above-mentioned reaction system after the completion of the dehydrogenation. Therefore, the desired rosin ester having excellent various properties of the present invention cannot be obtained at all, in case of using an unpurified rosin without purifying, or in case of merely disproportionating a purified rosin ester.

To the process of the present invention, it is indispensable to use a purified rosin as a raw rosin from the viewpoints of color tone, stability and the like of the resulting rosin ester. The above-mentioned purified rosin means a purified product of gum rosin, wood rosin and tall oil rosin, of which main components are resin acids such as abietic acid, palustric acid, neoabietic acid, pimaric acid, isopimaric acid and dehydroabietic acid.

The term purification described here is intended to mean removing high molecular weight materials which are presumed to be formed from peroxides contained in the unpurified rosin, and unsaponifiable materials which are originally contained in the above-mentioned rosin. Concretely, the purification may be carried out according to usual purification methods such as distillation, recrystallization and extraction. From the viewpoint of purifying the raw material industrially, it is preferable that the rosin is purified by distillation. In case of purifying the rosin by distillation, usually a temperature of 200° to 300° C. and a pressure of 1 to 10 mmHg are employed suitably with giving a consideration of the period of time for distilling. In case of purifying the rosin by recrystallization, the recrystallization can be carried out, for instance, by preparing a solution of the disproportionated rosin in a good solvent, distilling the good solvent out of the solution to give a concentrated solution and then adding a poor solvent thereto. Examples of the good solvent are, for instance, benzene, toluene, xylene, chloroform, lower alcohols, ketones such as acetone, acetates such as ethyl acetate, and the like. Examples of the poor solvent are, for instance, n-hexane, n-heptane, cyclohexane, isooctane, and the like. Further, the purified raw rosin can be also produced by preparing an alkaline solution of the raw rosin with an alkaline aqueous solution, extracting unsaponifiable materials which are not dissolved in the alkaline aqueous solution with an organic solvent and then neutralizing the extracted aqueous layer.

To the process of the present invention, it is indispensable to heat the above-mentioned purified rosin and an alcohol in the presence of a disproportionating catalyst, and then to simultaneously carry out disproportionation and esterification. The above-mentioned simultaneous reactions enable to inhibit deterioration caused by oxidation in esterification, and further to shorten a period of reaction time and reduce production costs.

Examples of the disproportionating catalyst employed in the above-mentioned reaction process are various known catalysts, for instance, metal-supported catalysts such as palladium carbon, rhodium carbon and platinum carbon, powder of metals such as nickel and platinum, iodine, iodides such as iron iodide, and the like. Among them, it is preferable to employ to a palladium catalyst, a rhodium catalyst or a platinum catalyst. The above-mentioned catalyst is usually employed in an amount of 0.01 to 5% by weight, preferably 0.01 to 1.0% by weight on the basis of the amount of the purified rosin employed. Examples of the alcohol employed in the above process are, for instance, monohydric alcohols such as n-octyl alcohol, 2-ethylhexyl alcohol, decyl alcohol and lauryl alcohol; dihydric alcohols such as ethylene glycol, diethylene glycol, propylene glycol, neopentyl glycol and cyclohexanedimethanol; trihydric alcohols such as glycerol, trimethylolethane and trimethylolpropane; and tetrahydric alcohols such as pentaerythritol and diglycerol; and the like.

The above-mentioned simultaneous reactions can be carried out according to the known methods as they are under the above-mentioned various conditions. For instance, they may be carried out by heating the mixture of the purified rosin and one of various alcohols described above usually at 150° to 300° C. in a stream of an inert gas in the presence of the disproportionating catalyst and continued with removing generated water from the mixture outside of the reaction system until the resultant having the desired properties is obtained. An esterifying catalyst is not necessarily required in the above-mentioned reactions. However, the esterifying catalyst may be employed so as to shorten the period of reaction time. Examples of the esterifying catalyst employed are, for instance, acidic catalysts such as acetic acid and paratoluenesulfonic acid, alkaline metal hydroxides such as calcium hydroxide, metal oxides such as calcium oxide, metal oxides such as calcium oxide and magnesium oxide, and the like.

To the process of the present invention, it is indispensable to subject the reaction product obtained by the above-mentioned step to dehydrogenation. The term dehydrogenation described here means the changing of ratio in the composition of dehydroabietic acid and dihydroabietic acid being main resin acid components in the above-mentioned disproportionated rosin ester, concretely, the increasing of a dehydroabietic acid content which is caused by dehydrogenating dihydroabietic acid component to give dehydroabietic acid. According to the above-mentioned dehydrogenation, 2 moles of hydrogen is generated from 1 mole of dihydroabietic acid component. The generated hydrogen enables to efficiently reduce peroxides which exist in a small amount in the esterified compounds of the purified disproportionated rosin. Namely, a fairly light-colored rosin ester can be obtained by utilizing the above-mentioned reducing action in this step.

The reaction conditions of the above-mentioned dehydrogenation are not particularly limited, and usual conditions can be employed. For instance, it may be carried out by heating the obtained rosin ester in a closed reaction vessel in the presence of a dehydrogenating catalyst under an initial pressure of hydrogen of less than 10 Kg/cm$^2$, preferably less than 5 Kg/cm$^2$ at a reaction temperature of 100° to 300° C., preferably 200° to 280° C. In the above reaction, hydrogen is not substantially required because it is a dehydrogenation. However, less than 10 Kg/cm$^2$ of an initial pressure of hydrogen is determined on purpose to utilize the generated hydrogen for reducing peroxides, as described above. The pressure of hydrogen may be adjusted by its own pressure of the generated hydrogen, or by supplying a little amount of hydrogen to the vessel from the outside thereof. In the process of the present invention, there is no limitation in the dehydrogenating catalyst, and various known catalysts can be employed. Preferably, a palladium catalyst, a rhodium catalyst or a platinum catalyst is employed as the dehydrogenating catalyst. The above-mentioned catalyst is usually supported onto a carrier such as silica or carbon and then employed. The amount of the employed dehydrogenating catalyst is usually 0.01 to 5% by weight, preferably 0.05 to 3% by weight based upon the amount of the employed rosin ester. In case of carrying out the dehydrogenation, a solvent, for instance, an alicyclic hydrocarbon such as cyclohexane or decalin, an aromatic hydrocarbon such as toluene or xylene, or the like, can be suitably employed.

Although the composition of resin acids in the rosin ester obtained according to the above-mentioned process slightly varies with a pressure of supplied hydrogen, usually it is 15 to 35% by weight of dihydro component and 85 to 65% by weight of dehydroabietic acid. Also, the peroxide value of thus obtained rosin ester is usually not more than 1.

To the process of the present invention, it is indispensable to add an organic phosphorus compound after the completion of the above-mentioned step. Nearly colorless rosin ester being the desired product of the present invention can be obtained first by adding the above-mentioned organic phosphorus compound to the rosin ester and then treating the mixture with heating. The organic phosphorus compound is represented by the following formula:

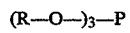

$$(R\text{---}O\text{---})_3\text{---}P$$

wherein R groups are the same or different, and each is a member selected from the group consisting of a C$_1$–C$_{12}$ alkyl group, phenyl group, a phenyl group substituted by a C$_1$14 C$_{12}$ alkyl group and a phenyl group substituted by two C$_1$–C$_{12}$ alkyl groups.

Examples of the organic phosphorus compound are, for instance, triphenyl phosphite, tricresyl phosphite, diphenylisodecyl phosphite, phenyldiisodecyl phosphite, 4,4'-butylidene-bis(3-methyl-6-t-butylphenyl-ditridecyl) phosphite, cyclic neopentanetetraylbis(octadecylphosphite), tris(nonylphenyl) phosphite, tris(dinonylphenyl) phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa- 10-phosphaphenanthrene and the like. Among them, it is preferable to employ various phosphorus compounds such as triphenyl phosphite, diphenylisodecyl phosphite, phenyldiisodecyl phosphite, tris(nonylphenyl) phosphite and tris(dinonylphenyl) phosphite from the viewpoints of the effect for light-coloring, the effect for stabilization and costs.

The above-mentioned organic phosphorus compound is employed in an amount of not more than 1.0% by weight, preferably not more than 0.5% by weight on the basis of the amount of a purified rosin compound employed as a starting material. In case that the amount is more than 1.0% by weight, the effect caused by using an excess of the above-mentioned organic phosphorus compound is not obtained, and it is uneconomical.

The method for adding the organic phosphorus compound is not particularly limited so far as the organic phosphorus compound is added to the above-mentioned reaction system after the completion of dehydrogenation. Usually a reaction pressure is rised to ordinary pressure, and then the organic phosphorus compound is preferably added as rapidly as possible, after the completion of dehydrogenation. Further, the organic phosphorus compound is more preferably added under an atmosphere wherein oxygen is not contained. Also, a temperature of a reaction system for adding the organic phosphorus compound is not particularly limited. The reaction temperature may be not more than the decomposition temperature of the above-mentioned organic phosphorus compound. Usually the temperature is not more than 275° C. In case that the organic phosphorus compound exists in the reaction system of dehydrogenation, the compound inhibits the progress of dehydrogenation. Therefore, such case is not preferable by reason that color tone of the resulting rosin compound is deteriorated.

The rosin ester obtained according to the above-mentioned process of the present invention, of which appearance is nearly equal to colorless, has excellent various properties such as odorless at heating, a high stability and a good compatibility. Therefore, the rosin ester of the invention can be suitably used as tackifiers for pressure-sensitive adhesives and hot-melt adhesives, modifiers for rubbers and various plastics, raw materials for traffic paints, modifiers for ink and paints and the like. When the rosin ester of the invention is employed in those uses, value of final products as goods can be improved.

The processes for preparing a colorless rosin of the present invention are explained hereinafter.

There are two kinds of processes for preparing a colorless rosin of the present invention. One of them is a process for obtaining a rosin having the excellent various properties such as odorless at heating and a high stability, of which appearance is nearly equal to colorless, by subjecting a purified rosin as a starting material to disproportionation and dehydrogenation, and then adding an organic phosphorus compound having various functions such as a function for decomposing peroxides, a function for inhibiting oxidation and a function for inhibiting coloring to the reaction system.

It has been considered that coloring of a rosin compound is caused by high molecular weight materials and unsaponifiable materials which are contained in a raw rosin, the resin acid having a conjugated double bond which exhibits a high oxygen absorbing property, such as abietic acid, among the above-mentioned resin acids, and the like. Thus the process of the present invention has been accomplished on purpose to remove the above-mentioned causes. To the process of the present invention, are indispensable (1) to employ a purified rosin as a raw rosin, (2) to simultaneously subject the above-mentioned purified rosin to disproportionation and dehydrogenation, and (3) thereafter to add an organic phosphorus compound which can function as an agent for decomposing peroxides, an oxidation inhibitor or the like to the above-mentioned reaction system.

Therefore, the desired rosin having excellent various properties of the present invention cannot be obtained at all, in case of subjecting an unpurified rosin to disproportionation and dehydrogenation and then adding an organic phosphorus compound thereto, or in case of subjecting an unpurified rosin to disproportionation and dehydrogenation and then purifying the resulting rosin.

The above-mentioned purified rosin being a starting material of the present invention means a purified product of gum rosin, wood rosin and tall oil rosin, of which main components are resin acids such as abietic acid, palustric acid, neoabietic acid, pimaric acid, isopimaric acid and dehydroabietic acid.

The term purification described here is intended to mean removing high molecular weight materials which are presumed to be formed from peroxides contained in the unpurified raw rosin, and unsaponifiable materials which are originally contained in the above-mentioned rosin. Concretely, the purification may be carried out according to usual purification methods such as distillation, recrystallization and extraction. From the viewpoint of purifying the raw material industrially, it is preferable that the rosin is purified by distillation. In case of purifying the rosin by distillation, usually a temperature of 200° to 300° C. and a pressure of 1 to 10 mmHg are employed suitably with giving a consideration of the period of time for distilling. In case of purifying the rosin by recrystallization, the recrystallization can be carried out, for instance, by preparing a solution of the unpurified rosin in a good solvent, distilling the good solvent out of the solution to give a concentrated solution and then adding a poor solvent thereto. Examples of the good solvent are, for instance, benzene, toluene, xylene, chloroform, lower alcohols, ketones such as acetone, acetates such as ethyl acetate, and the like. Examples of the poor solvent are, for instance, n-hexane, n-heptane, cyclohexane, isooctane, and the like. Further, the purified raw rosin can be also produced by preparing an alkaline solution of the raw rosin with an alkaline aqueous solution, extracting unsaponifiable materials which are not dissolved in the alkaline aqueous solution with an organic solvent and then neutralizing the extracted aqueous layer.

For the process of the present invention, it is necessary to subject the above-mentioned purified rosin to disproportionation and dehydrogenation. The reaction conditions of the above-mentioned reactions are not particularly limited, and usual conditions can be employed. For instance, the above-mentioned purified rosin may be heated in a closed reaction vessel in the presence of a catalyst under an initial pressure of hydrogen of less than 10 Kg/cm$^2$, preferably less than 5 Kg/cm$^2$ at a reaction temperature of 100° to 300° C., preferably 200° to 280° C. In the above reactions, hydrogen is not substantially required because they are disproportionation and dehydrogenation. However, less than 10 Kg/cm$^2$ of an initial pressure of hydrogen is determined on purpose to utilize the generated hydrogen for reducing peroxides, as described above. The pressure of hydrogen may be adjusted by its own pressure of the generated hydrogen, or by supplying a little amount of hydrogen to the vessel from the outside thereof. In the process of the present invention, there is no limitation in the above-mentioned catalyst, and various known catalysts can be employed. Preferably, a palladium catalyst, a rhodium catalyst or a platinum catalyst is employed as the catalyst. The above-mentioned catalyst is usually supported onto a carrier such as silica or carbon and then employed. The amount of the employed catalyst is usually 0.01 to 5% by weight, preferably 0.05 to 3% by weight based upon the amount of the employed rosin. In case of carrying out the dehydrogenation, a solvent, for instance, an alicyclic hydrocarbon such as cyclohexane or decalin, an aromatic hydrocarbon such as toluene or xylene, or the like, can be suitably employed.

Although the composition of resin acids in the rosin obtained according to the above-mentioned process slightly varies with a pressure of supplied hydrogen, usually it is 15 to 35% by weight of dihydro component and 85 to 65% by weight of dehydroabietic acid. Also, the peroxide value of thus obtained rosin is usually not more than 1.

To the process of the present invention, it is indispensable to add an organic phosphorus compound after the completion of the above-mentioned step. Thereby, color tone and stability of thus obtained rosin are further improved. The above-mentioned organic phosphorus compound is represented by the following formula:

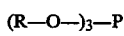

wherein R groups are the same or different, and each is a member selected from the group consisting of a $C_1$–$C_{12}$ alkyl group, phenyl group, a phenyl group substituted by a $C_1$–$C_{12}$ alkyl group and a phenyl group substituted by two $C_1$–$C_{12}$ alkyl groups.

Examples of the organic phosphorus compound are, for instance, triphenyl phosphite, tricresyl phosphite, diphenylisodecyl phosphite, phenyldiisodecyl phosphite, 4,4'-butylidene-bis(3-methyl-6-t-butylphenyl-ditridecyl) phosphite, cyclic neopentanetetraylbis(octadecylphosphite), tris(nonylphenyl) phosphite, tris(dinonylphenyl) phosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene and the like. Among them, it is preferable to employ various phosphorus compounds such as triphenyl phosphite, diphenylisodecyl phosphite, phenyldiisodecyl phosphite, tris(nonylphenyl)phosphite and tris(dinonylphenyl) phosphite in consideration of the effect for light-coloring, the effect for stabilization and costs.

The above-mentioned organic phosphorus compound is employed in an amount of not more than 1.0% by weight, preferably not more than 0.5% by weight on the basis of the amount of the purified rosin employed as a starting material. In case that the amount is less than 0.01% by weight, sufficiently improved effect is not obtained. In case that the amount is more than 1.0% by weight, the effect caused by using an excess of the above-mentioned organic phosphorus compound is not obtained, and it is uneconomical.

The method for adding the organic phosphorus compound is not particularly limited so far as the organic phosphorus compound is added to the above-mentioned reaction system after the completion of the above-mentioned reactions. Usually a reaction pressure is raised to ordinary pressure after the completion of the reactions, and then the organic phosphorus compound is preferably added as rapidly as possible. Further, the organic phosphorus compound is more preferably added under an atmosphere wherein oxygen is not contained. Also, a temperature of a reaction system for adding the organic phosphorus compound is not particularly limited. The reaction temperature may be not more than the decomposition temperature of the above-mentioned organic phosphorus compound. Usually the temperature is not more than 275° C. In case that the organic phosphorus compound exists in the reaction system of the above-mentioned reactions, the compound inhibits the progress of dehydrogenation. Therefore, such case is not preferable by reason that color tone of the resulting rosin is deteriorated.

The finally desired rosin obtained according to the above-mentioned process of the present invention, of which appearance is nearly equal to colorless, has excellent various properties such as odorless at heating, a high stability and a good compatibility. Therefore, the rosin of the invention can be suitably used as emulsifiers for producing synthetic rubbers or in an emulsion polymerization in a form of an alkalin metal salt as well as modifiers for a soap composition for cleaning. Also, the esterified compound derived from the above-mentioned rosin can be suitably used as tackifiers for hot-melt adhesives, modifiers for rubbers and various plastics, raw materials for traffic paints, modifiers for ink and paints, coating materials for pigments, flux for solders and the like. When the rosin of the invention is employed in those uses, value of final products as goods can be improved.

The other process for preparing a colorless rosin of the present invention is explained below.

The other is a process for obtaining a rosin having the excellent various properties such as odorless at heating and a high stability, of which appearance is nearly equal to colorless, by dehydrogenating a purified disproportionated rosin being a specific raw rosin.

To the process of the present invention, it is indispensable to employ a purified disproportionated rosin as a starting material from the viewpoints of color tone, stability and the like of the finally resulting rosin. The above-mentioned purified disproportionated rosin means a reaction product obtained by disproportionating gum rosin, wood rosin and tall oil rosin, of which main components are resin acids such as abietic acid, palustric acid, neoabietic acid, pimaric acid, isopimaric acid and dehydroabietic acid, and then purifying the resulting rosin.

In the above-mentioned disproportionation, the conventional reaction conditions of disproportionation can be suitably employed. That is, the disproportionation is carried out by heating an unpurified rosin in the presence of a disproportionating catalyst. Examples of the disproportionating catalyst are various known catalysts, for instance, metal-supported catalysts such as palladium carbon, rhodium carbon and platinum carbon, powder of metals such as nickel and platinum, iodine, iodides such as iron iodide, and the like. The above-mentioned catalyst is usually employed in an amount of 0.01 to 5% by weight, preferably 0.01 to 1.0% by weight on the basis of the amount of the unpurified rosin employed. The reaction temperature is 100° to 300° C., preferably 150° to 290° C.

In the process of the present invention, it is necessary to purify the above-mentioned unpurified disproportionated rosin obtained in the preceding step. The term purification described here is intended to mean removing high molecular weight materials which are presumed to be formed from peroxides contained in the undisproportionated and disproportionated rosins, and unsaponifiable materials which are originally contained in the above-mentioned rosins. Concretely, the purification may be carried out according to usual purification methods such as distillation, recrystallization and extraction. From the viewpoint of purifying the raw material industrially, it is preferable that the rosin is purified by distillation. In case of purifying the rosin by distillation, usually a temperature of 200° to 300° C. and a pressure of 1 to 10 mmHg are employed suitably in consideration of the period of time for distilling. In case of purifying the rosin by recrystallization, the recrystallization can be carried out, for instance, by preparing a solution of the unpurified disproportionated rosin in a good solvent, distilling the good solvent out of the solution to give a concentrated solution and then adding a poor solvent thereto. Examples of the good solvent are, for instance, benzene, toluene, xylene, chloroform, lower alcohols, ketones such as acetone, acetates such as ethyl acetate, and the like. Examples of the poor solvent are, for instance, n-hexane, n-heptane, cyclohexane, isooctane, and the like. Further, the purified disproportionated rosin can be also produced by preparing an alkaline solution of the unpurified disproportionated rosin with an alkaline aqueous solution, extracting unsaponifiable materials which are not dissolved in the alkaline aqueous solution with an organic solvent and, if desired, then neutralizing the extracted aqueous layer.

Therefore, the desired rosin having excellent various properties of the present invention cannot be obtained at all, in case of merely dehydrogenating an unpurified disproportionated rosin, or in case of dehydrogenating an unpurified disproportionated rosin and then purifying the resultant.

In the process of the present invention, it is necessary to subject the above-mentioned purified disproportionated rosin to dehydrogenation. The reaction conditions of the above-mentioned dehydrogenation are not particularly limited, and usual conditions can be employed. For instance, it may be carried out by heating the obtained purified disproportionated rosin in a closed reaction vessel in the presence of a dehydrogenating catalyst under an initial pressure of hydrogen of less than 10 $Kg/cm^2$, preferably less than 5 $Kg/cm^2$ at a reaction temperature of 100° to 300° C., preferably 200° to 280° C. In the above-mentioned reaction, hydrogen is not substantially required because it is dehydrogenation. However, less than 10 $Kg/cm^2$ of an initial pressure of hydrogen is determined on purpose to utilize the generated hydrogen for reducing peroxides, as described above. The pressure of hydrogen may be adjusted by its own pressure of the generated hydrogen, or by supplying a little amount of hydrogen to the vessel from the outside thereof. In the process of the present invention, there is no limitation in the dehydrogenating catalyst, and various known catalysts can be employed. Preferably, a palladium catalyst, a rhodium catalyst or a platinum catalyst is employed as the dehydrogenating catalyst. The above-mentioned catalyst is usually supported onto a carrier such as silica or carbon and then employed. The amount of the employed dehydrogenating catalyst is usually about 0.01 to 5% by weight, preferably 0.05 to 3% by weight based upon the amount of the above-mentioned purified disproportionated rosin employed. In case of carrying out the dehydrogenation, a solvent, for instance, an alicyclic hydrocarbon such as cyclohexane or decalin, an aromatic hydrocarbon such as toluene or xylene, or the like can be suitably employed.

Although the composition of resin acids in the finally desired rosin obtained according to the above-mentioned process of the present invention slightly varies with a pressure of supplied hydrogen, usually the composition is 15 to 35% by weight of dihydro component and 85 to 65% by weight of dehydroabietic acid. Also, the peroxide value of thus obtained rosin is usually not more than 1.

The desired rosin obtained according to the above-mentioned process of the present invention, of which appearance is nearly equal to colorless, has excellent various properties such as odorless at heating, a high stability and a good compatibility. Therefore, the rosin of the invention can be suitably used as emulsifiers for producing synthetic rubbers or in an emulsion polymerization in a form of an alkalin metal salt as well as modifiers for a soap composition for cleaning. Also, the esterified compound derived from the above-mentioned rosin of the invention can be suitably used as tackifiers for hot-melt adhesives, modifiers for rubbers and various plastics, raw materials for traffic paints, base materials of chewing gum, modifiers for ink and paints, coating materials for pigments, flux for solders and the like.

When the rosin of the invention is employed in those uses, value of final products as goods can be improved.

BEST MODE FOR CARRYING OUT THE INVENTION

The processes for preparing a rosin ester and a colorless rosin of the present invention are more particularly described and explained by means of the following Examples and Comparative Examples in which all percents are by weight unless otherwise noted. It is to be understood that the present invention is not limited to the Examples.

EXAMPLE 1

(1) Disproportionation

To 1000 g of unpurified gum rosin from China having an acid value of 172 and a softening point of 75° C. and a Gardner color of 6 was added 0.3 g of a 5% palladium carbon as a catalyst. The mixture was subjected to disproportionation by agitating at 280° C. for 4 hours in an atmosphere of nitrogen to give a disproportionated rosin having an acid value of 157, a softening point of 77° C. and a Gardner color of 8.

(2) Purification

The disproportionated rosin obtained in the above was distilled under a reduced pressure of 3 mmHg in an atmosphere of nitrogen to give a purified disproportionated rosin in a main fraction.

The results are shown in Table 1.

TABLE 1

|  | Distilling temperature (°C.) | Still pot temperature (°C.) | Acid value | Yield (%) |
| --- | --- | --- | --- | --- |
| Initial fraction | 195> | 210> | 57 | 5.0 |
| Main fraction | 195 to 250 | 210 to 280 | 178 | 86.8 |
| Residue | 250< | 280< | 30 | 8.1 |

(3) Esterification

Five hundred grams of the purified disproportionated rosin having an acid value of 178, a softening point of 83° C. and a Gardner color of 4 obtained in the above-mentioned distillation was placed in a flask having a content volume of 1 l and heated up to 180° C. in an atmosphere of nitrogen. With agitating the rosin in a molten state, 60 g of glycerol was added to the rosin at 200° C. The mixture was heated up to 280° C. and subjected to esterification at 280° C. for 12 hours to give 515 g of a purified disproportionated rosin ester having an acid value of 3.4, a softening point of 99° C. and a Gardner color of 5.

(4) Dehydrogenation

Two hundred grams of the purified disproportionated rosin ester obtained in the above-mentioned (3) and 1 g of a 5% palladium carbon were charged into a shaking type autoclave having a content volume of 1 l and then oxygen was removed from the autoclave. An inner pressure of the autoclave was compressed with hydrogen under a pressure of 0.5 $Kg/cm^2$ and the rosin ester contained therein was heated up to 270° C. Then, the rosin ester was subjected to dehydrogenation at 270° C. for 3 hours to give 197 g of a rosin ester having an acid value of 8.5, a softening point of 99° C. and a Gardner color of not more than 1 (Hazen color of 150).

EXAMPLE 2

(1) Five hundred grams of the purified disproportionated rosin obtained in the (2) of Example 1 was placed in a flask having a content volume of 1 l and heated up to 180° C. in an atmosphere of nitrogen. With agitating the rosin in a molten state, 43 g of glycerol and 33 g of diethylene glycol were added to the rosin at 200° C. The mixture was heated up to 270° C. and subjected to esterification at 270° C. for 12 hours to give 517 g of a purified disproportionated rosin ester having an acid value of 3.7, a softening point of 75° C. and a Gardner color of 5.

(2) Two hundred grams of the purified disproportionated rosin ester obtained in the (1) of Example 2 and 1 g of a 5% palladium carbon were charged into a shaking type autoclave having a content volume of 1 l. Then, the dehydrogenation was carried out in the same manner as described in the (4) of Example 1 to give 198 g of a rosin ester having an acid value of 7.6, a softening point of 74 ° C. and a Gardner color of not more than 1 (Hazen color of 120).

EXAMPLE 3

(1) Five hundred grams of the purified disproportionated rosin obtained in the (2) of Example 1 was placed in a flask having a content volume of 1 l and heated up to 180° C. in an atmosphere of nitrogen. With agitating the rosin in a molten state, 79 g of diglycerol was added to the rosin at 200° C. The mixture was heated up to 280° C. and subjected to esterification at 280° C. for 13 hours to give 517 g of a purified disproportionated rosin ester having an acid value of 5.5, a softening point of 103° C. and a Gardner color of 7.

(2) Two hundred grams of the purified disproportionated rosin ester obtained in the (1) of Example 3 and 1 g of a 5% palladium carbon were charged into a shaking type autoclave having a content volume of 1 l. Then, the dehydrogenation was carried out in the same manner as described in the (4) of Example 1 to give 198 g of a rosin ester having an acid value of 9.8, a softening point of 104° C. and a Gardner color of not more than 1 (Hazen color of 170).

Comparative Example 1

The unpurified disproportionated rosin obtained in the (1) of Example 1 was subjected to esterification in the same manner as described in the (3) of Example 1 to give 505 g of an unpurified disproportionated rosin ester having an acid value of 4.5, a softening point of 93° C. and a Gardner color of 10. The obtained unpurified disproportionated rosin ester was subjected to dehydrogenation in the same manner as described in the (4) of Example 1 to give 197 g of a rosin ester having an acid value of 8.5, a softening point of 95° C. and a Gardner color of 7.

The various properties of the rosin esters obtained in Examples 1-3 and Comparative Example 1 were measured according to the following tests. The results are shown in Tables 2 and 3.

(Peroxide value)

Peroxide value was measured according to Standard Testing Method of Fats and Oils (2.4.12-86) of The Japan Oil Chemist's Society.

(Composition of resin acids in a rosin ester)

Each of rosin esters before and after subjecting to dehydrogenation was hydrolyzed. Thus obtained hydrolysate was subjected to gas chromatography according to ASTM D3008-82.

(Thermal stability)

In a test tube having an inner diameter of 1.5 cm and a height of 15 cm was put 10 g of a sample. The test tube was allowed to stand in an air-circulating oven at 200° C. without sealing. The change in the color tone (Gardner) of the sample was observed with a lapse of time.

(Weatherability)

A can for ointment having an inner diameter of 5.6 cm and a height of 1 cm was charged with 2.0 g of a resin having a particle size of 60 to 100 meshes. The can was irradiated with a 400 watt mercury lamp at a distance of 40 cm for 15 hours. The amount of weight gained in the rosin ester (oxygen absorption) was measured and the change in the color tone (Gardner) of the rosin ester was observed. The color tone was observed when the rosin ester was dissolved into toluene to give a 50% toluene solution of the rosin ester.

TABLE 2

| | Before dehydrogenation | | | After dehydrogenation | | |
|---|---|---|---|---|---|---|
| | | Composition of resin acids (% by weight) | | | Composition of resin acids (% by weight) | |
| | Peroxide value | Dihydro component | Dehydro component | Peroxide value | Dihydro component | Dehydro component |
| Ex. 1 | 3.4 | 40.5 | 59.5 | 0.2 | 20.3 | 79.7 |
| Ex. 2 | 2.9 | 40.0 | 60.0 | 0.2 | 19.8 | 81.2 |
| Ex. 3 | 3.8 | 39.3 | 60.7 | 0.3 | 23.3 | 76.7 |
| Com. Ex. 1 | 10.5 | 39.9 | 60.1 | 2.5 | 26.5 | 73.5 |

TABLE 3

| | Thermal stability | | | | Weatherability | | |
|---|---|---|---|---|---|---|---|
| | | | | | Amount of oxygen absorption | Color tone change | |
| | After 0 hour | After 4 hours | After 10 hours | After 24 hours | (% by weight) | After 0 hour | After 15 hours |
| Ex. 1 | not more than 1 | 2 | 4 | 5 | 0.10 | not more than 1 | 1 |
| Ex. 2 | not more than 1 | 1 | 3 | 5 | 0.09 | not more than 1 | 1 |
| Ex. 3 | not more than 1 | 3 | 5 | 6 | 0.15 | not more than 1 | 2 |
| Com. Ex. 1 | 7 | 8 | 10 | 12 | 0.35 | 5 | 7 |

EXAMPLE 4

(1) Purification

Unpurified gum rosin from China having an acid value of 171, a softening point of 76° C. and a Gardner color of 6 was distilled under a reduced pressure of 3 mmHg in an atmosphere of nitrogen to give a purified rosin having general constants of an acid value of 176, a softening point of 79° C. and a Gardner color of 4 in a main fraction.

The results are shown in Table 4.

TABLE 4

|  | Distilling temperature (°C.) | Still pot temperature (°C.) | Acid value | Yield (%) |
|---|---|---|---|---|
| Initial fraction | 195> | 210> | 58 | 4.7 |
| Main fraction | 195 to 250 | 210 to 280 | 176 | 86.9 |
| Residue | 250< | 280< | 32 | 8.4 |

(2) Simultaneous reactions of disproportionation and esterification

Six hundred grams of the above-mentioned purified rosin was placed in a flask having a content volume of 1 l and heated up to 180° C. in an atmosphere of nitrogen. With agitating the rosin in a molten state, 68 g of glycerol and 0.18 g of a 5% palladium carbon (water content 50%) as a dehydrogenating catalyst were added to the rosin at 200° C. The mixture was heated up to 275° C. and simultaneously subjected to disproportionation and esterification at 275° C. for 12 hours to give a reaction product having an acid value of 3.3, a softening point of 98° C. and a Gardner color of 3 to 4.

(3) Dehydrogenation

Two hundred grams of the reaction product obtained in the above-mentioned (2) and 1 g of a 5% palladium carbon (water content 50%) were charged into a shaking type autoclave having a content volume of 1 l and then oxygen was removed from the autoclave. An inner pressure of the autoclave was compressed with hydrogen under a pressure of 0.5 Kg/cm$^2$ and the rosin ester contained therein was heated up to 275° C. Then, the rosin ester was subjected to dehydrogenation at 275° C. for 3 hours to give a rosin ester having an acid value of 9.5, a softening point of 98° C. and a Gardner color of 2.

(4) Addition of an organic phosphorus compound

To 100 g of the rosin ester obtained in the above-mentioned (3) was added 0.1 g of triphenyl phosphite. The mixture was agitated at about 200° C. for 30 minutes, and then an inner temperature of the autoclave was cooled down to ordinary temperature to give a desired rosin ester having an acid value of 9.5, a softening point of 97° C. and a Hazen color of 120.

EXAMPLE 5

Five hundred grams of the purified rosin obtained in the (1) of Example 4 was placed in a flask having a content volume of 1 g and heated up to 180° C. in an atmosphere of nitrogen. With agitating the rosin in a molten state, 39.5 g of glycerol, 30.5 g of diethylene glycol and 0.15 g of palladium carbon were added to the rosin at 200° C. The mixture was heated up to 270° C. and subjected to esterification at 270° C. for 12 hours to give a reaction product having an acid value of 6.9, a softening point of 75° C. and a Gardner color of 3. Then, the reaction product was subjected to dehydrogenation in the same manner as described in the (3) of Example 4 to give a rosin ester having an acid value of 11.2, a softening point of 74° C. and a Gardner color of 1. Thus obtained rosin ester was treated in the same manner as described in the (4) of Example 4 to give a desired rosin ester having an acid value of 11.2, a softening point of 73.5° C. and a Hazen color of 120.

EXAMPLE 6

Five hundred grams of the purified rosin obtained in the (1) of Example 4 was placed in a flask having a content volume of 1 l and heated up to 180° C. in an atmosphere of nitrogen. With agitating the rosin in a molten state, 77 g of diglycerol and 0.15 g of palladium carbon were added to the rosin at 200° C. The mixture was heated up to 280° C. and subjected to esterification at 280° C. for 12 hours to give a reaction product having an acid value of 5.8, a softening point of 102° C. and a Gardner color of 3. Then, the reaction product was subjected to dehydrogenation in the same manner as described in the (3) of Example 4 to give a rosin ester having an acid value of 10.8, a softening point of 101° C. and a Gardner color of 2. Thus obtained rosin ester was treated in the same manner as described in the (4) of Example 4 to give a desired rosin ester having an acid value of 10.8, a softening point of 100° C. and a Hazen color of 150.

EXAMPLES 7 and 8

The same procedure as described in Example 4 was repeated except that 0.2 g of tris(nonylphenyl) phosphite or 0.2 g of diphenylisodecyl phosphite was employed in Example 7 or 8, respectively instead of 0.1 g of triphenyl phosphite employed in the (4) of Example 4 to give a rosin ester. In Example 7 was obtained a rosin ester having an acid value of 9.4, a softening point of 97.5° C. and a Hazen color of 150. In Example 8 was obtained a rosin ester having an acid value of 9.4, a softening point of 97.5° C. and a Hazen color of 150.

Comparative Example 2

The raw rosin employed in Example 4, i.e., the unpurified gum rosin from China having an acid value of 171, a softening point of 76° C. and a Gardner color of 6 was employed as it was without subjecting to purification. Each of the same procedure as described in the (2) to (4) of Example 4 was repeated except that the unpurified rosin was employed instead of the purified rosin employed in the procedure described in the (2) of Example 4 to give a rosin ester having an acid value of 9.6, a softening point of 95° C. and a Gardner color of 5.

Comparative Example 3

The reaction product obtained in the (2) of Example 4 (the rosin ester having an acid value of 3.3, a softening point of 98° C. and a Gardner color of 3-4) was tested as it was.

The properties of the rosin esters obtained in Examples 4-8 and Comparative Examples 2 and 3 were measured according to the following tests. The results are shown in Tables 5 and 6.

(Peroxide value)

Peroxide value was measured according to Standard Testing Method of Fats and Oils (2.4.12-86) of The Japan Oil Chemist's Society.

(Composition of resin acids in a rosin ester)

Each of rosin esters before and after subjecting to dehydrogenation was hydrolyzed. Thus obtained hydrolysate was subjected to gas chromatography according to ASTM D3008-82.

(Thermal stability)

In a test tube having an inner diameter of 1.5 cm and a height of 15 cm was put 10 g of a sample. The test tube was allowed to stand in an air-circulating oven at 200° C. without sealing. The change in the color tone (Gardner) of the sample was observed with a lapse of time.

(Weatherability)

A can for ointment having an inner diameter of 5.6 cm and a height of 1 cm was charged with 2.0 g of a resin having a particle size of 60 to 100 meshes. The can was irradiated with a 400 watt mercury lamp at a distance of 40 cm for 15 hours. The amount of weight gained in the rosin ester (oxygen absorption) was measured and the change in the color tone (Gardner) of the rosin ester was observed. The color tone was observed when the rosin ester was dissolved into toluene to give a 50% toluene solution of the rosin ester.

of 171.3, a softening point of 85.5° C. and a Gardner color of 2.

(3) Addition of an organic phosphorus compound

To 100 g of the above-mentioned rosin was added 0.1 g of triphenyl phosphite. The mixture was agitated at about 200° C. for 30 minutes, and then an inner temperature of the autoclave was cooled down to ordinary temperature to a rosin having an acid value of 171.2, a

TABLE 5

| | Before dehydrogenation | | | After dehydrogenation | | |
|---|---|---|---|---|---|---|
| | | Composition of resin acids (% by weight) | | | Composition of resin acids (% by weight) | |
| | Peroxide value | Dihydro component | Dehydro component | Peroxide value | Dihydro component | Dehydro component |
| Ex. 4 | 4.8 | 39.0 | 61.0 | 0.2 | 24.3 | 75.7 |
| Ex. 5 | 4.3 | 35.4 | 64.6 | 0.2 | 23.1 | 76.9 |
| Ex. 6 | 4.9 | 37.0 | 63.0 | 0.3 | 24.4 | 75.6 |
| Ex. 7 | 4.8 | 39.0 | 61.0 | 0.3 | 24.3 | 75.7 |
| Ex. 8 | 4.8 | 39.0 | 61.0 | 0.3 | 24.3 | 75.7 |
| Com. Ex. 2 | 11.2 | 41.5 | 46.1 | 2.3 | 31.7 | 68.3 |
| Com. Ex. 3 | 4.8 | 39.0 | 61.0 | — | — | — |

TABLE 6

| | Thermal stability | | | | Weatherability | | |
|---|---|---|---|---|---|---|---|
| | | | | | Amount of oxygen absorption | Color tone change | |
| | After 0 hour | After 4 hours | After 10 hours | After 24 hours | (% by weight) | After 0 hour | After 15 hours |
| Ex. 4 | not more than 1 | 1 | 4 | 6 | 0.13 | not more than 1 | 2 |
| Ex. 5 | not more than 1 | 2 | 4 | 6 | 0.15 | not more than 1 | 2 |
| Ex. 6 | not more than 1 | 2 | 4 | 6 | 0.11 | not more than 1 | 2 |
| Ex. 7 | not more than 1 | 2 | 5 | 7 | 0.18 | not more than 1 | 2-3 |
| Ex. 8 | not more than 1 | 2 | 5 | 7 | 0.15 | not more than 1 | 2-3 |
| Com. Ex. 2 | 5 | 6 | 8 | 10 | 0.43 | 3 | 5 |
| Com. Ex. 3 | 3-4 | 6 | 7 | 9 | 0.50 | 2 | 4 |

EXAMPLE 9

(1) Purification

Unpurified gum rosin from China having an acid value of 172, a softening point of 75° C. and a Gardner color of 6 was distilled under a reduced pressure of 3 mmHg in an atmosphere of nitrogen to give a purified rosin having general constants of an acid value of 175.2, a softening point of 80.0° C. and a Gardner color of 4 in a main fraction.

The results are shown in Table 7.

TABLE 7

| | Distilling temperature (°C.) | Still pot temperature (°C.) | Acid value | Yield (%) |
|---|---|---|---|---|
| Initial fraction | 195> | 210> | 56.3 | 4.3 |
| Main fraction | 195 to 250 | 210 to 280 | 175.2 | 87.5 |
| Residue | 250< | 280< | 31.5 | 8.2 |

(2) Disproportionation and dehydrogenation

Two hundred grams of the above-mentioned purified rosin and 0.6 g of a 5% palladium carbon (water content 50%) were charged into a shaking type autoclave having a content volume of 1 l and then oxygen was removed from the autoclave. An inner pressure of the autoclave was compressed with hydrogen under a pressure of 0.5 Kg/cm² and the rosin contained therein was heated up to 275° C. Then, the rosin was simultaneously subjected to disproportionation and dehydrogenation at 275° C. for 3 hours to give a rosin having an acid value softening point of 85.0° C. and a Hazen color of 120.

EXAMPLES 10 and 11

The same procedure as described in Example 9 was repeated except that 0.2 g of tris(nonylphenyl) phosphite or 0.2 g of diphenylisodecyl phosphite was employed in Example 10 or 11, respectively instead of 0.1 g of triphenyl phosphite employed in Example 9 to give a rosin. In Example 10 was obtained a rosin having an acid value of 170.7, a softening point of 84.5° C. and a Hazen color of 150. In Example 11 was obtained a rosin having an acid value of 171.1, a softening point of 84.5° C. and a Hazen color of 150.

Comparative Example 4

The raw rosin employed in Example 9, i.e., the unpurified gum rosin from China having an acid value of 172, a softening point of 75° C. and a Gardner color of 6 was employed as it was without subjecting to purification. The same procedure as described in the (2) to (3) of Example 9 was repeated except that the unpurified rosin was employed instead of the purified rosin employed in the procedure described in the (2) of Example 9 to give a rosin having an acid value of 167.3, a softening point of 84° C. and a Gardner color of 5.

Comparative Example 5

The rosin obtained in the (2) of Example 9 was tested.

The properties of the rosin obtained in Examples 9–11 and Comparative Examples 4 and 5 were measured according to the following tests. The results are shown in Tables 8 and 9.

(Peroxide value)

Peroxide value was measured according to Standard Testing Method of Fats and Oils (2.4.12–86) of The Japan Oil Chemist's Society.

(Composition of resin acids in a rosin)

Each of rosins before and after subjecting to disproportionation and dehydrogenation was subjected to gas chromatography according to ASTM D3008-82.

(Thermal stability)

In a test tube having an inner diameter of 1.5 cm and a height of 15 cm was put 10 g of a sample. The test tube was allowed to stand in an air-circulating oven at 200° C. without sealing. The change in the color tone (Gardner) of the sample was observed with a lapse of time.

(Weatherability)

A can for ointment having an inner diameter of 5.6 cm and a height of 1 cm was charged with 2.0 g of a resin having a particle size of 60 to 100 meshes. The can was irradiated with a 400 watt mercury lamp at a distance of 40 cm for 15 hours. The amount of weight gained in the rosin (oxygen absorption) was measured and the change in the color tone (Gardner) of the rosin was observed. The color tone was observed when the rosin was dissolved into toluene to give a 50% toluene solution of the rosin.

acid value of 176.5, a softening point of 82° C. and a Gardner color of 4 in a main fraction.

The results are shown in Table 10.

TABLE 10

|  | Distilling temperature (°C.) | Still pot temperature (°C.) | Acid value | Yield (%) |
|---|---|---|---|---|
| Initial fraction | 195> | 210> | 56.8 | 4.8 |
| Main fraction | 195 to 250 | 210 to 280 | 176.5 | 86.9 |
| Residue | 250< | 280< | 31.3 | 8.3 |

(3) Dehydrogenation

Two hundred grams of the purified product of the above-mentioned disproportionated rosin and 0.6 g of a 5% palladium carbon (water content 50%) were charged into a shaking type autoclave having a content volume of 1 l and then oxygen was removed from the autoclave. An inner pressure of the autoclave was compressed with hydrogen under a pressure of 0.5 Kg/cm$^2$ and the rosin contained therein was heated up to 275° C. Then, the rosin was subjected to dehydrogenation at 275° C. for 3 hours to give a rosin having an acid value of 171.7, a softening point of 87° C. and a Gardner color of not more than 1 (Hazen color of 120).

TABLE 8

| | Before disproportionation and dehydrogenation | | | After disproportionation and dehydrogenation | | |
|---|---|---|---|---|---|---|
| | | Composition of resin acids (% by weight) | | | Composition of resin acids (% by weight) | |
| | Peroxide value | Dihydro component | Dehydro component | Peroxide value | Dihydro component | Dehydro component |
| Ex. 9 | 2.8 | 0 | 7.1 | 0.4 | 29.7 | 70.3 |
| Ex. 10 | 2.8 | 0 | 7.1 | 0.6 | 29.7 | 70.3 |
| Ex. 11 | 2.8 | 0 | 7.1 | 0.5 | 29.7 | 70.3 |
| Com. Ex. 4 | 10.5 | 0 | 3.5 | 2.5 | 31.6 | 68.4 |
| Com. Ex. 5 | 2.8 | 0 | 7.1 | 1.2 | 29.7 | 70.3 |

TABLE 9

| | Thermal stability | | | | Weatherability | | |
|---|---|---|---|---|---|---|---|
| | | | | | Amount of oxygen absorption | Color tone change | |
| | After 0 hour | After 4 hours | After 10 hours | After 24 hours | (% by weight) | After 0 hour | After 15 hours |
| Ex. 9 | not more than 1 | 4 | 6 | 9 | 0.15 | not more than 1 | 2 |
| Ex. 10 | not more than 1 | 5 | 7 | 10 | 0.21 | not more than 1 | 2 |
| Ex. 11 | not more than 1 | 4 | 7 | 10 | 0.18 | not more than 1 | 2 |
| Com. Ex. 4 | 5 | 8 | 10 | 13 | 0.52 | 4 | 7 |
| Com. Ex. 5 | 2 | 7 | 9 | 12 | 0.36 | 1–2 | 4 |

EXAMPLE 12

(1) Disproportionation

To 1000 g of unpurified gum rosin from China having an acid value of 172 and a softening point of 75° C. and a Gardner color of 6 was added 0.3 g of a 5% palladium carbon (water content 50%) as a disproportionating catalyst. The mixture was subjected to disproportionation by agitating at 280° C. for 4 hours in an atmosphere of nitrogen to give an unpurified disproportionated rosin having an acid value of 160, a softening point of 78° C. and a Gardner color of 7.

(2) Purification

The unpurified disproportionated rosin obtained in the above was distilled under a reduced pressure of 3 mmHg in an atmosphere of nitrogen to give a purified disproportionated rosin having general constants of an

EXAMPLE 13

The same procedure as described in Example 12 was repeated except that the amount of a 5% palladium carbon (water content 50%) employed was 0.2 g instead of 0.6 g in the (3) of Example 12 to give a rosin having an acid value of 174.6, a softening point of 87° C. and a Gardner color of not more than 1 (Hazen color of 150).

Comparative Example 6

The unpurified disproportionated rosin obtained in the (1) of Example 12 was subjected to dehydrogenation under the same conditions as described in the (3) of Example 12 to give a rosin having an acid value of 158, a softening point of 80° C. and a Gardner color of 5.

Comparative Example 7 rosin was dissolved into toluene to give a 50% toluene solution of the rosin.

TABLE 12

| | Before dehydrogenation | | | After dehydrogenation | | |
|---|---|---|---|---|---|---|
| | | Composition of resin acids (% by weight) | | | Composition of resin acids (% by weight) | |
| | Peroxide value | Dihydro component | Dehydro component | Peroxide value | Dihydro component | Dehydro component |
| Ex. 12 | 1.5 | 40.5 | 59.5 | 0.2 | 17.5 | 82.5 |
| Ex. 13 | 1.5 | 40.5 | 59.5 | 0.4 | 19.9 | 80.1 |
| Com. Ex. 6 | 4.3 | 39.8 | 60.2 | 1.8 | 22.4 | 77.6 |
| Com. Ex. 7 | — | — | — | 1.0 | 21.5 | 78.5 |

TABLE 13

| | Thermal stability | | | | Weatherability | | |
|---|---|---|---|---|---|---|---|
| | | | | | Amount of oxygen absorption | Color tone change | |
| | After 0 hour | After 4 hours | After 10 hours | After 24 hours | (% by weight) | After 0 hour | After 15 hours |
| Ex. 12 | not more than 1 | 3 | 5 | 9 | 0.12 | not more than 1 | 2 |
| Ex. 13 | not more than 1 | 4 | 6 | 10 | 0.15 | not more than 1 | 2 |
| Com. Ex. 6 | 5 | 7 | 10 | 13 | 0.50 | 4 | 6 |
| Com. Ex. 7 | 2 | 6 | 9 | 12 | 0.31 | 1-2 | 4 |

The rosin obtained in Comparative Example 6 was distilled under a reduced pressure of 3 mmHg in an atmosphere of nitrogen to give a final rosin having general constants of an acid value of 175.8, a softening point of 88° C. and a Gardner color of 2 in a main fraction.

The results are shown in Table 11.

TABLE 11

| | Distilling temperature (°C.) | Still pot temperature (°C.) | Acid value | Yield (%) |
|---|---|---|---|---|
| Initial fraction | 195> | 210> | 57.8 | 6.1 |
| Main fraction | 195 to 250 | 210 to 280 | 175.8 | 85.2 |
| Residue | 250< | 280< | 31.6 | 8.7 |

The properties of the rosins obtained in Examples 12 and 13 and Comparative Examples 6 and 7 were measured according to the following tests. The results are shown in Tables 12 and 13.

(Peroxide value)

Peroxide value was measured according to Standard Testing Method of Fats and Oils (2.4.12-86) of The Japan Oil Chemist's Society.

(Composition of resin acids in a rosin)

Each of rosins before and after subjecting to dehydrogenation was subjected to gas chromatography according to ASTM D3008-82.

(Thermal stability)

In a test tube having an inner diameter of 1.5 cm and a height of 15 cm was put 10 g of a sample. The test tube was allowed to stand in an air-circulating oven at 200° C. without sealing. The change in the color tone (Gardner) of the sample was observed with a lapse of time.

(Weatherability)

A can for ointment having an inner diameter of 5.6 cm and a height of 1 cm was charged with 2.0 g of a resin having a particle size of 60 to 100 meshes. The can was irradiated with a 400 watt mercury lamp at a distance of 40 cm for 15 hours. The amount of weight gained in the rosin (oxygen absorption) was measured and the change in the color tone (Gardner) of the rosin was observed. The color tone was observed when the

INDUSTRIAL USEFULNESS

According to the processes for preparing a rosin ester and the processes for preparing a colorless rosin, there can be cheaply provided a rosin ester and a colorless rosin which have remarkably improved various properties from the viewpoints of color tone, odor, stability and the like, in comparison with the properties of the known rosin esters and rosins.

We claim:

1. A process for preparing a rosin ester, which comprises esterifying a purified product of a disproportionated rosin with an alcohol, and then subjecting the esterified rosin to dehydrogenation in the presence of a dehydrogenating catalyst under a reaction pressure of less than 10 Kg/cm$^2$.

2. The process of claim 1, wherein said dehydrogenating catalyst is a palladium catalyst, a rhodium catalyst or a platinum catalyst.

3. The process of claim 1, wherein a composition of resin acids the rosin ester obtained by said dehydrogenation is 15 to 35% by weight of dihydro component and 85 to 65% by weight of dehydroabietic acid.

4. A process for preparing a rosin ester, which comprises heating a purified rosin and an alcohol in the presence of a disproportionating catalyst, simultaneously subjecting the resulting rosin to disproportionation and esterification, dehydrogenating the reactant in the presence of a dehydrogenating catalyst under a reaction pressure of less than 10 Kg/cm$^2$, and thereafter adding an organic phosphorus compound to the reaction system.

5. The process of claim 4, wherein each of said disproportionating catalyst and said dehydrogenating catalyst is a palladium catalyst, a rhodium catalyst or a platinum catalyst.

6. The process of claim 4, wherein a composition of resin acids in the rosin ester obtained by said dehydrogenation is 15 to 35% by weight of dihydro component and 85 to 65% by weight of dehydroabietic acid.

7. The process of claim 4, wherein an amount of said added organic phosphorus compound is 0.01 to 1.0% by weight on the basis of the amount of said purified rosin.

8. The process of claim 4, wherein said organic phosphorus compound is represented by the following formula:

(R—O—)$_3$—P wherein R groups are the same or different, and each is a member selected from the group consisting of a $C_1$–$C_{12}$ alkyl group, phenyl group, a phenyl group substituted by a $C_1$–$C_{12}$ alkyl group and a phenyl group substituted by two $C_1$–$C_{12}$ alkyl groups.

* * * * *